(12) United States Patent
Hansen et al.

(10) Patent No.: US 7,593,692 B2
(45) Date of Patent: Sep. 22, 2009

(54) RADAR DETECTION CIRCUIT FOR A WLAN TRANSCEIVER

(75) Inventors: Christopher J. Hansen, Sunnyvale, CA (US); Jason A. Trachewsky, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 697 days.

(21) Appl. No.: 10/815,163

(22) Filed: Mar. 31, 2004

(65) Prior Publication Data

US 2005/0059364 A1     Mar. 17, 2005

Related U.S. Application Data

(60) Provisional application No. 60/502,934, filed on Sep. 15, 2003.

(51) Int. Cl.
     H04B 17/00     (2006.01)
     H04B 1/26      (2006.01)
     H04B 15/00     (2006.01)

(52) U.S. Cl. .................. 455/67.11; 455/67.14; 455/313; 455/226.1

(58) Field of Classification Search ................ 455/67.3, 455/63, 223, 283, 575.1, 67.11, 67.13, 67.14, 455/63.1, 73, 313, 205–207, 226.1, 115.1, 455/115.2

See application file for complete search history.

(56) References Cited

U.S. PATENT DOCUMENTS 3,543,156 A     11/1970    Carroll et al.
5,889,821 A *   3/1999    Arnstein et al. ............. 375/285

FOREIGN PATENT DOCUMENTS

WO    WO 02/082844 A2    10/2002
WO    WO 03/001742 A1    1/2003
WO    WO 03/050560 A     6/2003

* cited by examiner

*Primary Examiner*—Eugene Yun
(74) *Attorney, Agent, or Firm*—Garlick Harrison & Markison; James A. Harrison

(57) ABSTRACT

A single chip radio transceiver includes circuitry that enables detection of radar signals to enable the radio transceiver to halt communications in overlapping communication bands to avoid interference with the radar transmitting the radar pulses. One design goal, however, is to avoid false triggers that result from spurious tones and omissions and that further detects radar signals even in circumstances in which a radar pulse has been masked or eliminated by interference. Accordingly, the radar detection block includes circuitry for detecting and measuring the radar signals in the presence of such interference. More specifically, the radar detection block includes a moving average filter, a threshold comparison state machine, and radar detection logic within software that is executed by a processor for determining whether a radar signal is present.

10 Claims, 15 Drawing Sheets

FIG. 1 communication system

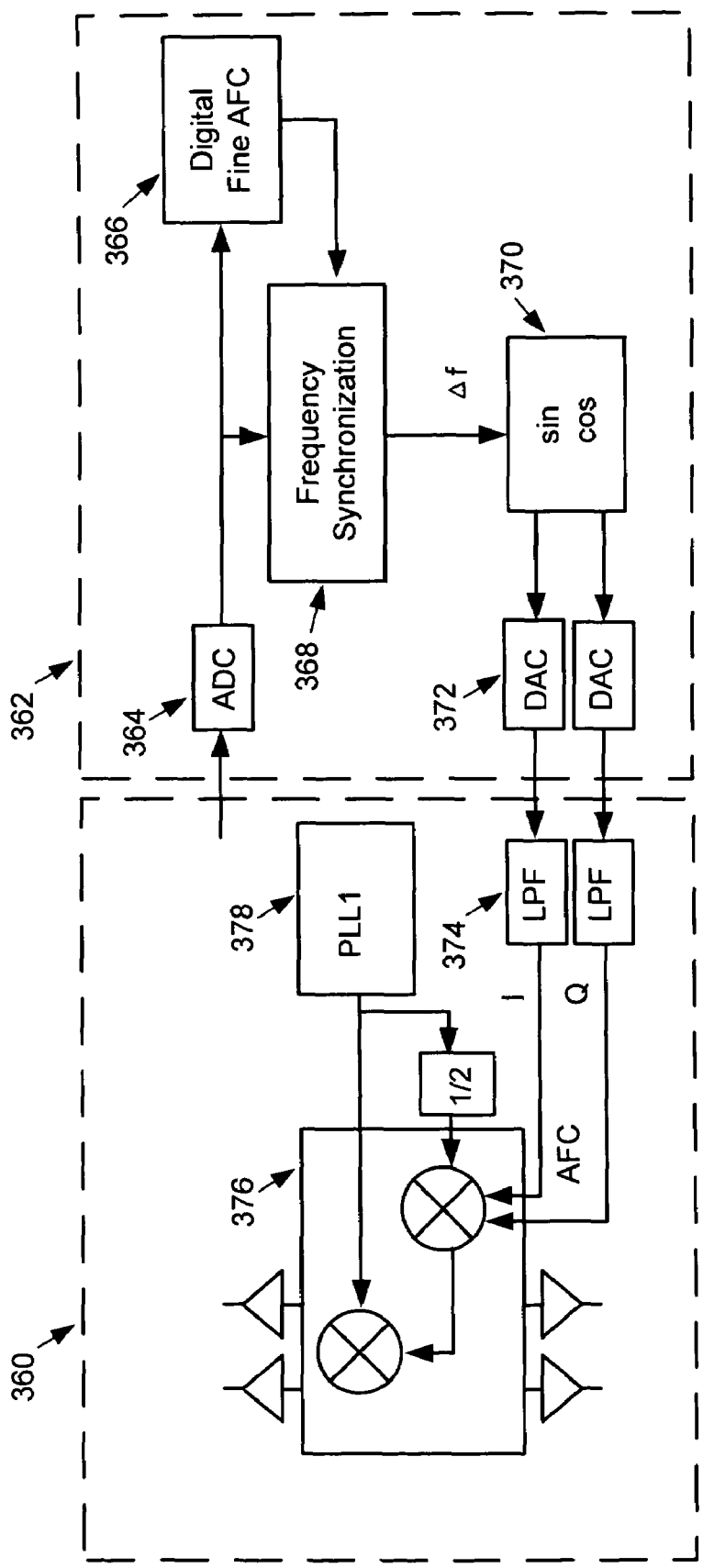
FIG. 4  receiver automatic frequency control circuit

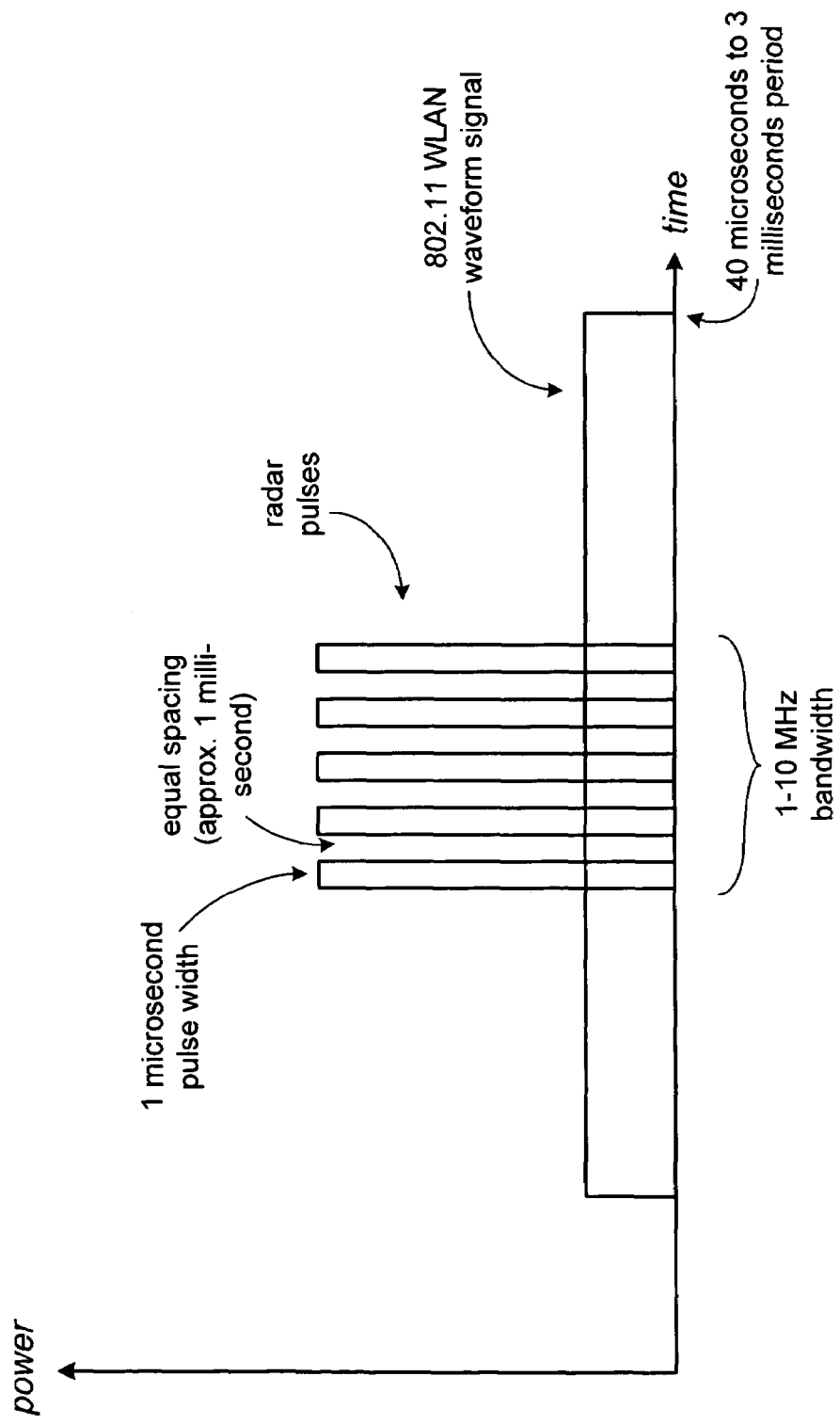
FIG. 5  radar and WLAN signals

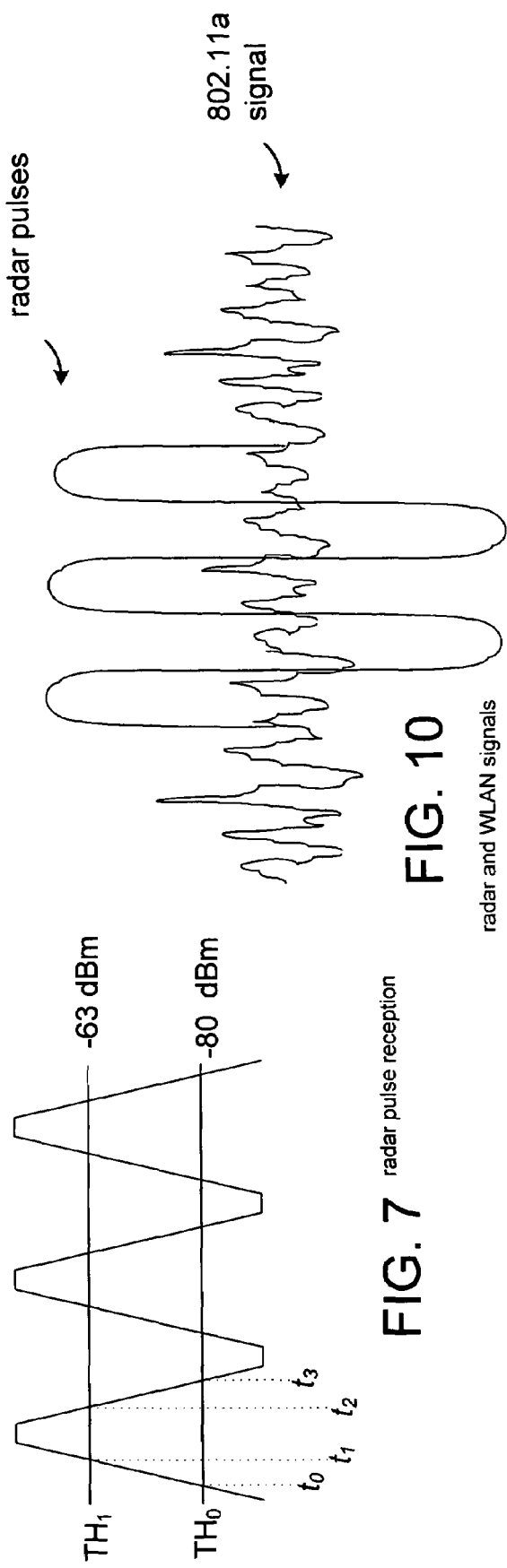
FIG. 10 radar and WLAN signals
FIG. 7 radar pulse reception
FIG. 6 groups of radar pulses

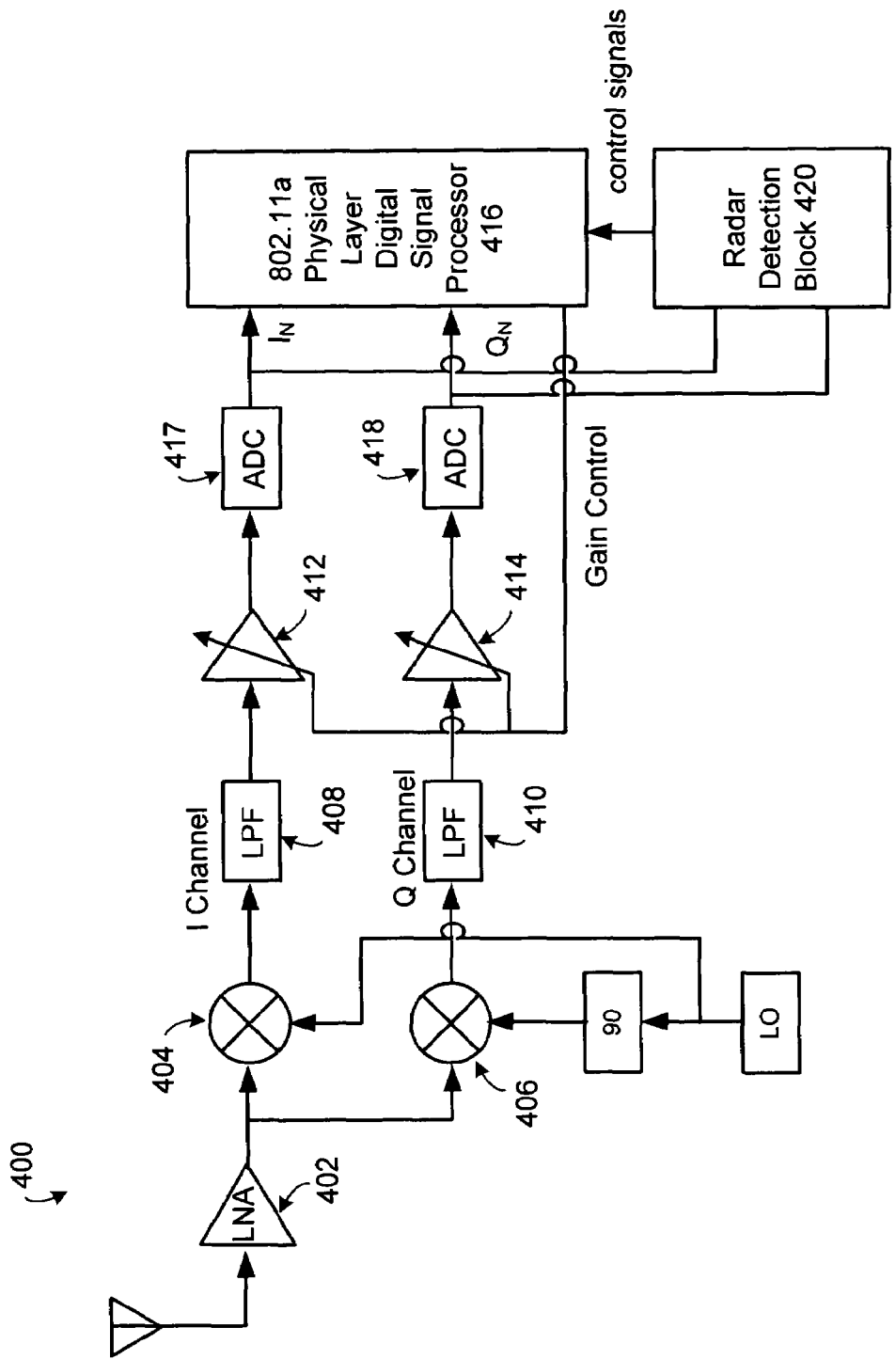
FIG. 8 receiver with radar detection block

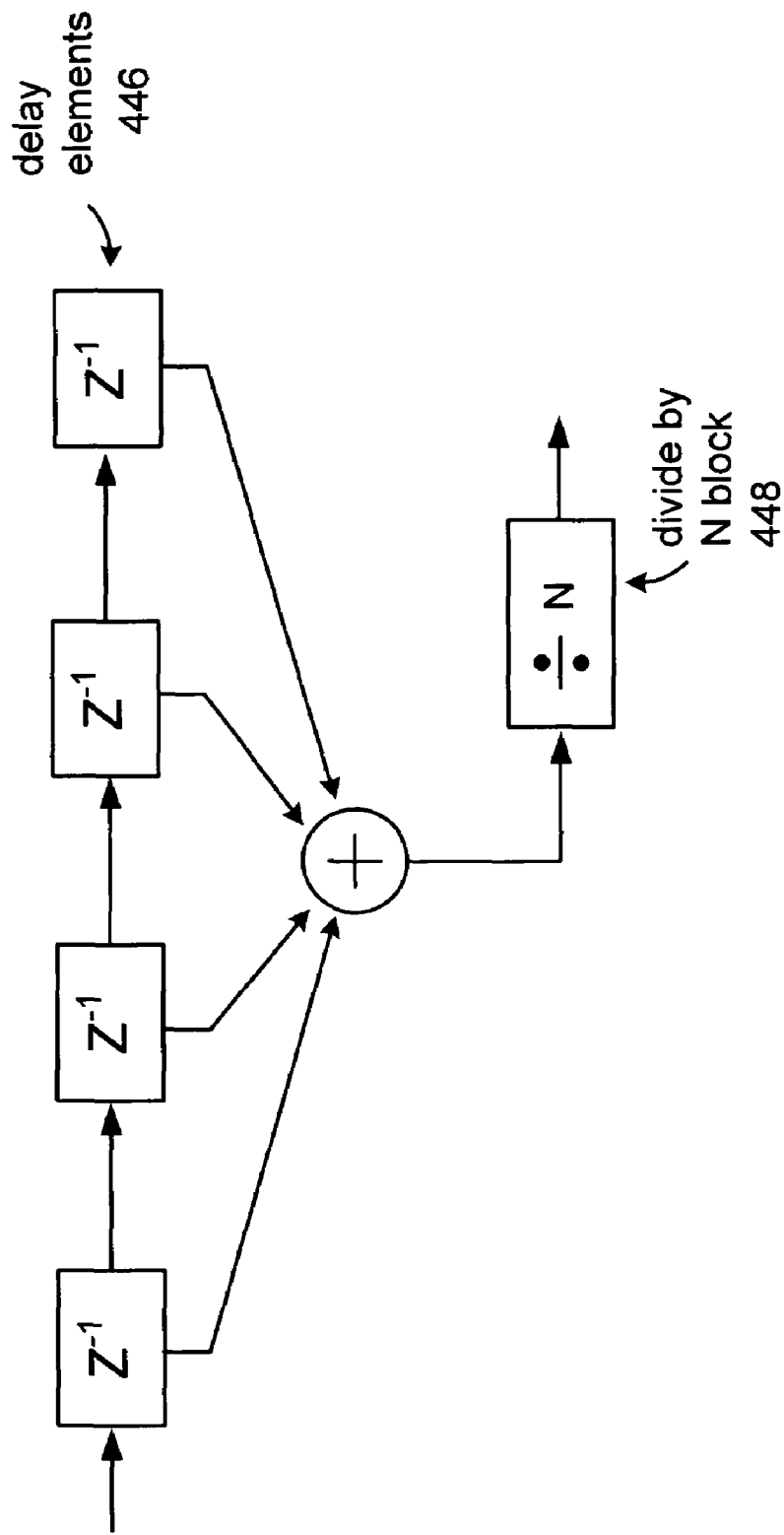
FIG. 11 moving average determination logic

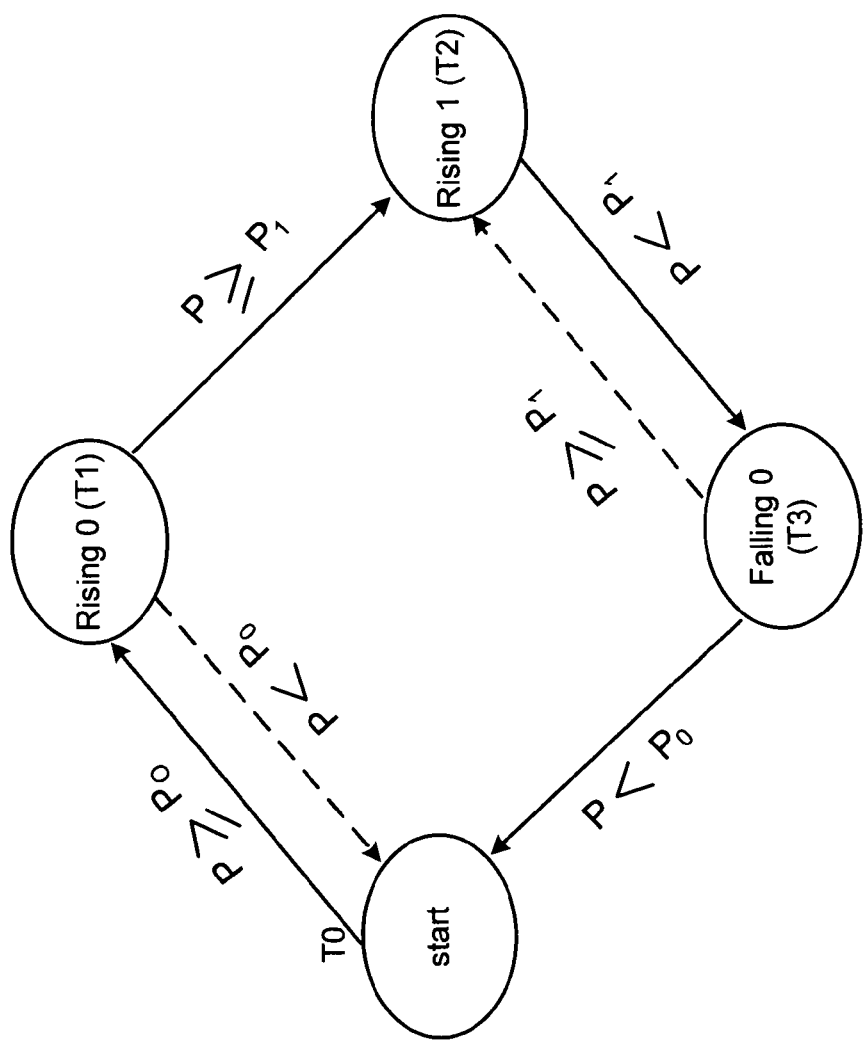
FIG. 12 state machine for detecting radar pulses

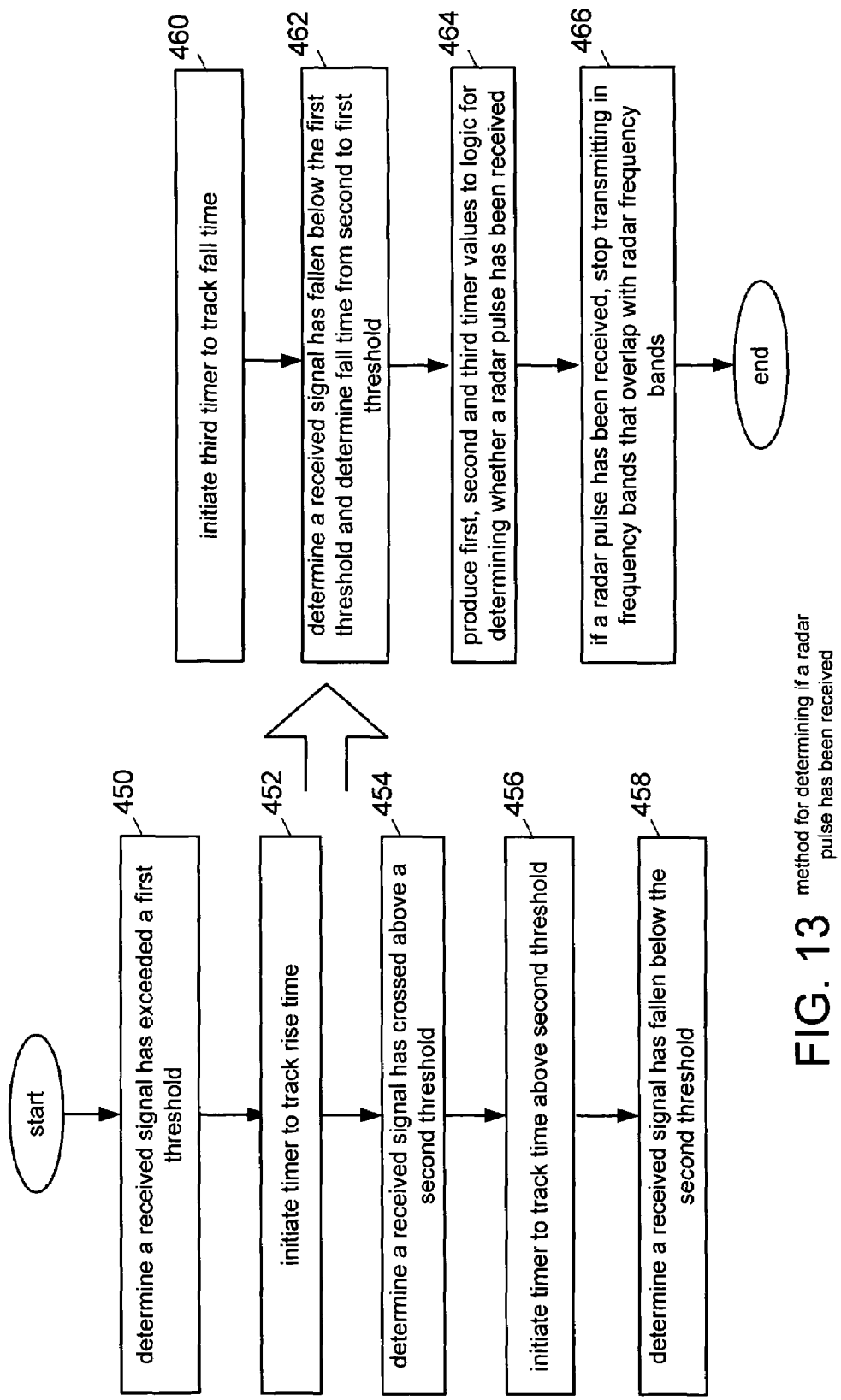
FIG. 13 method for determining if a radar pulse has been received

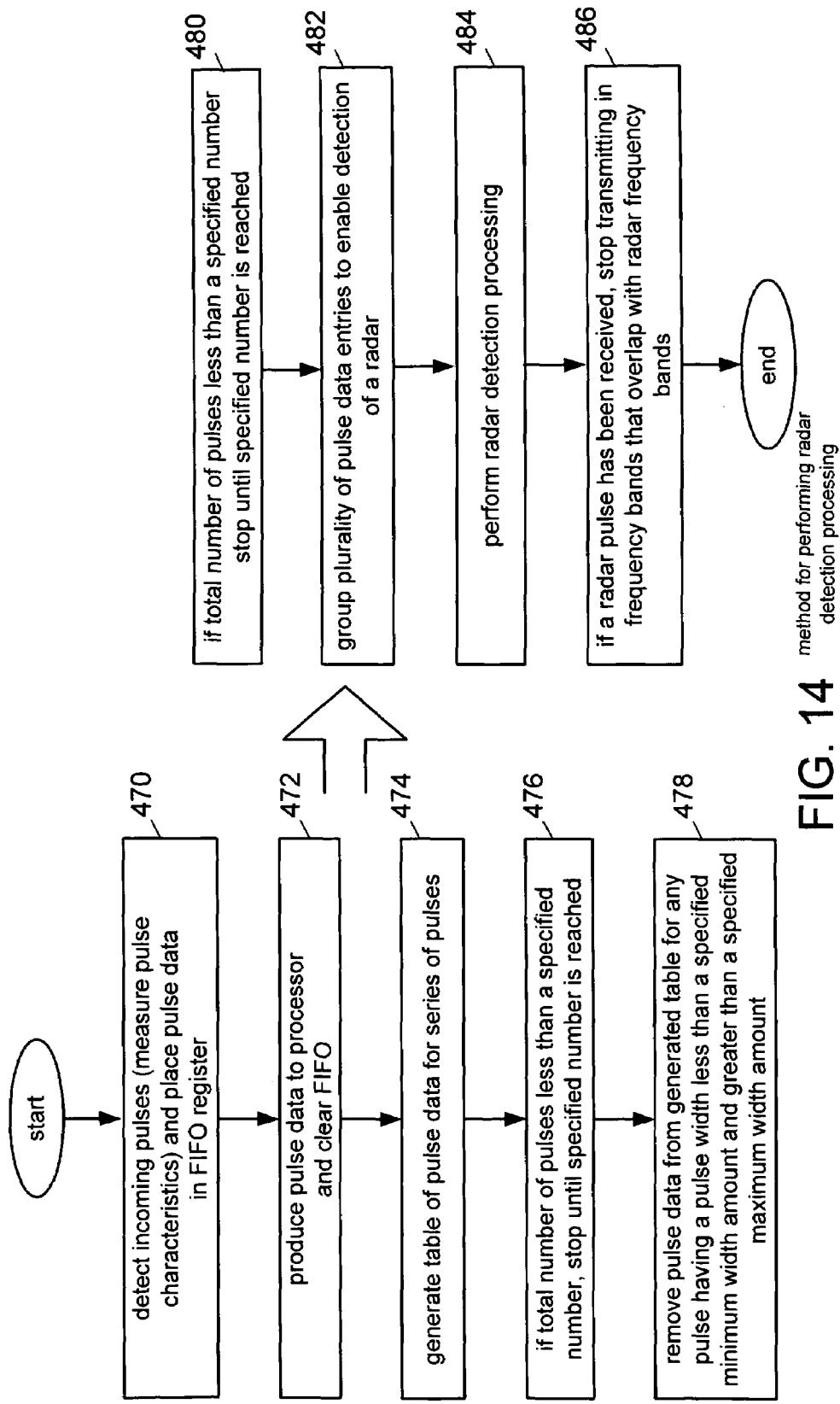
FIG. 14  method for performing radar detection processing

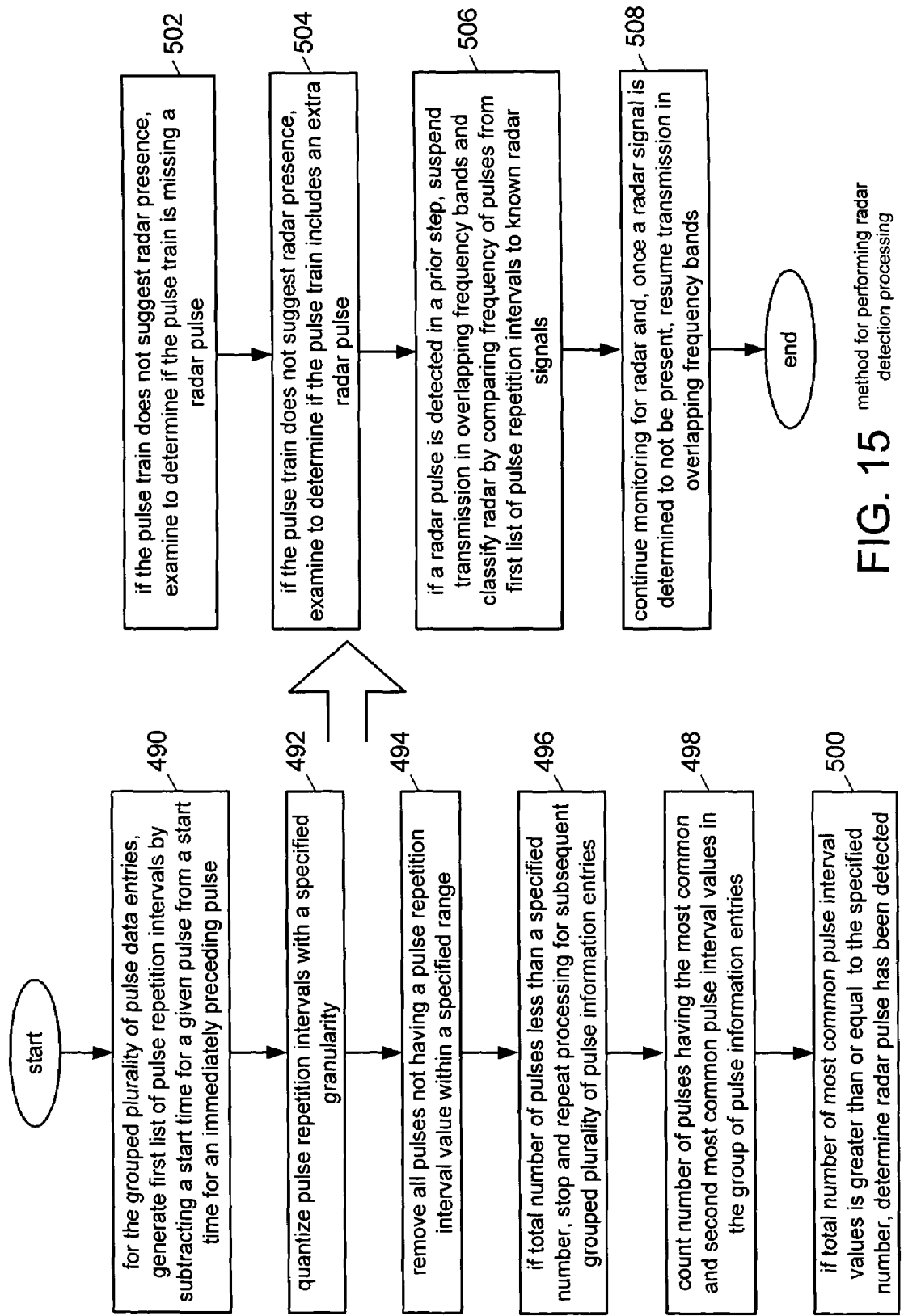
FIG. 15 method for performing radar detection processing

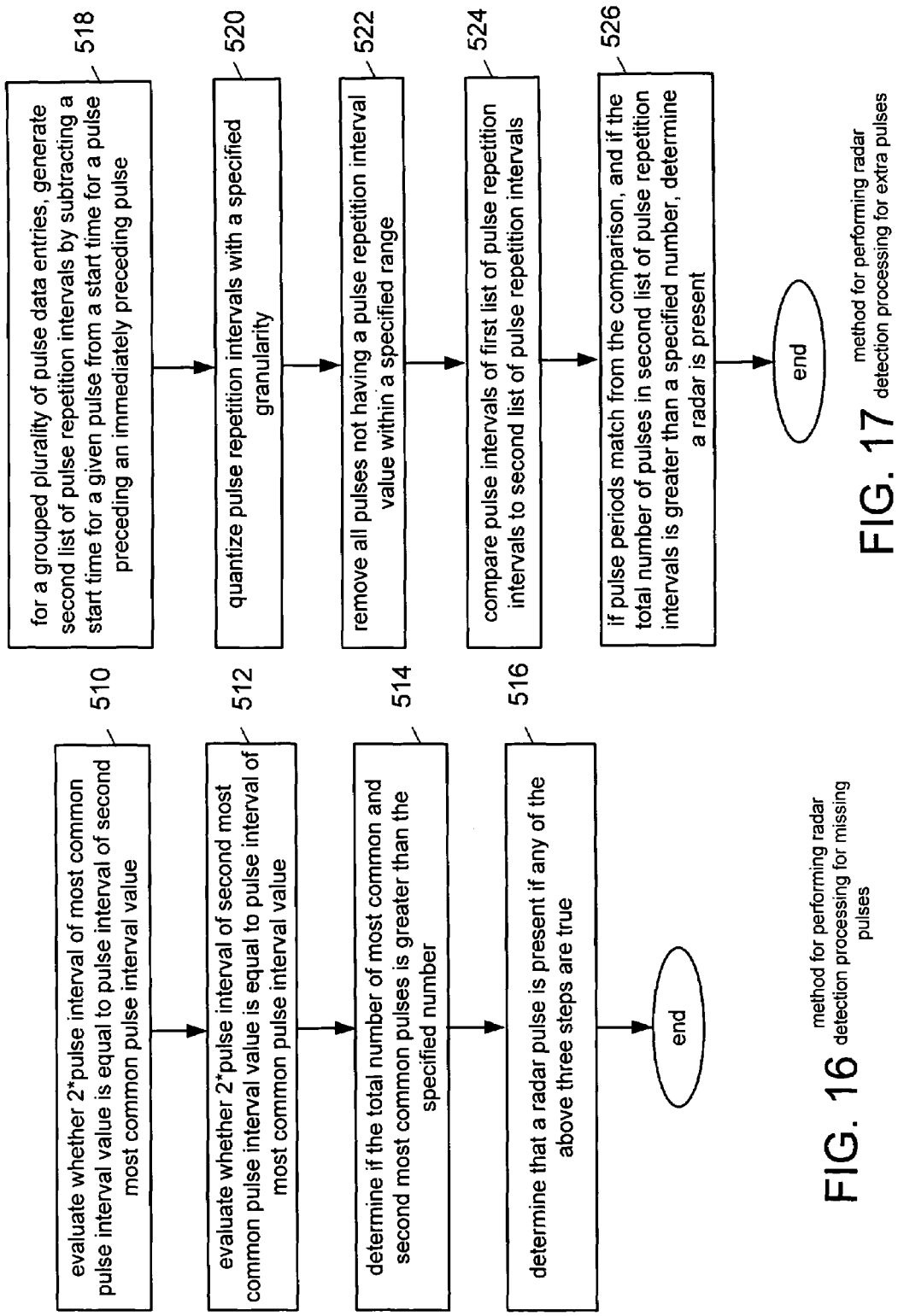

FIG. 18
method for performing radar detection processing

| start time | rise time | pulse width | fall time |
|---|---|---|---|
| A | B | C | D |
| E | F | G | H |
| I | J | K | L |
| M | N | O | P |
| Q | R | S | U |
| W | X | Y | Z | pulse 1, pulse 2, pulse 3, pulse 4, pulse 5, pulse n

FIG. 19
method for performing radar detection processing for missing pulses

| pulse interval | | pulse interval quantity by type |
|---|---|---|
| E – A | n1 | E – A |
| I – E | n2 | I – E |
| M – I | n3 | M – I |
| Q – M | n4 | Q – M |
| W – Q | n5 | W – Q |

FIG. 20
method for performing radar detection processing for extra pulses

| pulse interval | | pulse interval quantity by type |
|---|---|---|
| I – A | n1 | I – A |
| M – E | n2 | M – E |
| Q – I | n3 | Q – I |
| W – M | n4 | W – M |

RADAR DETECTION CIRCUIT FOR A WLAN TRANSCEIVER

CROSS REFERENCE TO RELATED APPLICATION

The present U.S. Utility Patent Application claims priority pursuant to 35 U.S.C. § 119(e) to U.S. Provisional Application Ser. No. 60/502,934, entitled "Radar Detection Circuit for a WLAN Receiver," filed Sep. 15, 2003, expired, which is hereby incorporated herein by reference in its entirety and made part of the present U.S. Utility Patent Application for all purposes:

BACKGROUND

1. Technical Field

The present invention relates to wireless communications and, more particularly, wideband wireless communication systems.

2. Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards, including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of a plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via a public switched telephone network (PSTN), via the Internet, and/or via some other wide area network.

Each wireless communication device includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with the particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier receives an inbound RF signal via the antenna and amplifies it. The one or more intermediate frequency stages mix the amplified RF signal with one or more local oscillations to convert the amplified RF signal into a baseband signal or an intermediate frequency (IF) signal. As used herein, the term "low IF" refers to both baseband and intermediate frequency signals. A filtering stage filters the low IF signals to attenuate unwanted out of band signals to produce a filtered signal. The data recovery stage recovers raw data from the filtered signal in accordance with the particular wireless communication standard.

One approach to using a higher intermediate frequency is to convert the RF signal to an intermediate frequency sufficiently low to allow the integration of on-chip channel selection filters. For example, some narrow band or low data rate systems, such as Bluetooth, use this low intermediate frequency design approach.

Active mixers used in direct conversion radios, as well as radios that employ an intermediate conversion step, typically comprise input transconductance elements, switches and an output load. These active mixers often have varying output signal characteristics due to environmental conditions, such as temperature, and process and manufacturing variations. These varying output signal characteristics can, for example, result in a mixer producing an errant local oscillation signal that affects the accuracy of an output signal's frequency. Having inaccurate output frequencies can result in many undesirable outcomes, including unwanted signal filtering by a downstream filter.

Other approaches are also being pursued to achieve the design goal of building entire radios on a single chip. With all of the foregoing design goals, however, there is being realized an increasing need for additional frequency bands for use by radio receivers and transmitters of all types. Along these lines, a frequency band that has heretofore been reserved exclusively for radar systems is being opened for use for at least some types of wireless communication systems. Among other systems, wireless local area network (LAN) systems are being developed to take advantage of the frequency band that is being opened up which has been reserved for radar. One design issue, however, that accompanies any wireless LAN device that operates in this frequency band is that of coexistence with radar systems. More specifically, a need exists for a wireless LAN transceiver to give priority to a radar when a radar operation is detected. Accordingly, the wireless LAN, in such a scenario, would be required to detect a radar signal within a specified response time and to communicate over a non-overlapping frequency band thereto.

Along these lines, recent changes to government regulations will allow wireless LANs (WLANs) to share frequency spectrum with licensed radar systems. Specifically, the frequency bands 5.25-5.35 GHz and 5.47-5.75 GHz will be open in Europe, and perhaps worldwide at some point in the future. Since these frequency bands are shared, the wireless LANs will be required to take a subordinate role to the licensed radar systems. This includes the incorporation of dynamic frequency selection (DFS) within the WLAN that will avoid spectrum that is occupied by a radar. What is needed, therefore, is a circuit and method for determining when a radar signal is present.

SUMMARY OF THE INVENTION

One embodiment of the present invention includes a radio receiver that further includes front-end circuitry for receiving, amplifying, down-converting and filtering an RF signal, and circuitry for converting the received down-converted, amplified and filtered RF signal into a digital signal and further includes a radar detection block (circuit) that monitors the incoming digital signals to detect the presence of radar. Generally, the radar signal includes a plurality of equally spaced pulses having a magnitude that is significantly greater than a magnitude of a signal transmitted according to any one of the various 802.11 protocols (though the invention includes any wireless LAN protocol in use). One design goal, however, is to avoid false triggers that result from spurious tones and omissions and that further detects radar signals even in circumstances in which a radar pulse has been masked or eliminated by interference. Accordingly, the radar detection block includes circuitry for detecting and measuring the radar signals in the presence of such interference. More specifically, the radar detection block includes a moving average filter, a threshold comparison state machine, and radar detection logic within software that is executed by a processor for determining whether a radar signal is present. A threshold comparison state machine measures the rise time and magnitude of an incoming signal. A radar signal typically generates a pattern of threshold crossings that, when interpreted by a processor, would yield data to facilitate the radio receiver being able to reach a conclusion that a radar signal is present. Accordingly, the radio receiver communicates with logic within the radio transceiver to inhibit transmissions in frequency bands that overlap the frequency bands of the radar signal.

A typical wireless LAN receiver, such as used to implement the 802.11a standard, is not capable of detecting the short, regular pulses of a radar system. This invention includes, therefore, additional circuitry to the wireless LAN receiver circuitry to enable radar pulse detection. There are three main components: a power detector circuit, a state machine, and a software-driven processor. The power detector circuit taps the received signal off the main path and computes the magnitude squared of the incoming (full bandwidth) signal. The output of the power detector circuit is applied to the state machine, which compares the instantaneous power to two different thresholds. This mechanism allows the measurement of the radar pulse start time, rise time, pulse width, and fall time. The state machine records these parameters into a pulse buffer. The software processor reads the pulse buffer and performs further processing as necessary to determine whether or not a radar is present.

Other aspects of the present invention will become apparent with further reference to the drawings and specification, which follow.

BRIEF DESCRIPTION OF THE DRAWINGS

A better understanding of the present invention can be obtained when the following detailed description of the preferred embodiment is considered with the following drawings, in which:

FIG. 4 is a functional schematic diagram of an automatic frequency control (AFC) circuit formed according to one described embodiment of the invention;

FIG. 5 is a diagram that illustrates the relative difference between a radar signal waveform and an 802.11 wireless LAN waveform signal;

FIG. 6 is a signal diagram illustrating two groups of pulses of a radar signal;

FIG. 7 is a diagram that illustrates the measurement of rise time and fall time of the pulses of the radar signal;

FIG. 8 is a functional block diagram of a portion of a radio transceiver according to one embodiment of the present invention;

FIG. 10 is a diagram illustrating signal waveforms for radar pulses and 802.11a signals;

FIG. 11 is a functional block diagram of a moving average block as employed in one embodiment of the present invention;

FIG. 12 illustrates a threshold comparison state machine; and

FIG. 13 is a flowchart illustrating a series of steps that are performed according to one embodiment of the present invention;

FIG. 14 is a flowchart illustrating a method for determining whether a radar signal is present according to one embodiment of the invention;

FIG. 15 is a flowchart illustrating a method for performing radar detection processing;

FIG. 16 is a flowchart illustrating a method for performing radar detection processing for missing pulses;

FIG. 17 is a flowchart illustrating a method for performing radar detection processing for extra pulses; and FIGS. 18, 19, and 20 illustrate the generation of data that is utilized in the described embodiments of the invention for determining whether a radar is present.

DETAILED DESCRIPTION OF THE DRAWINGS

Figure 1:
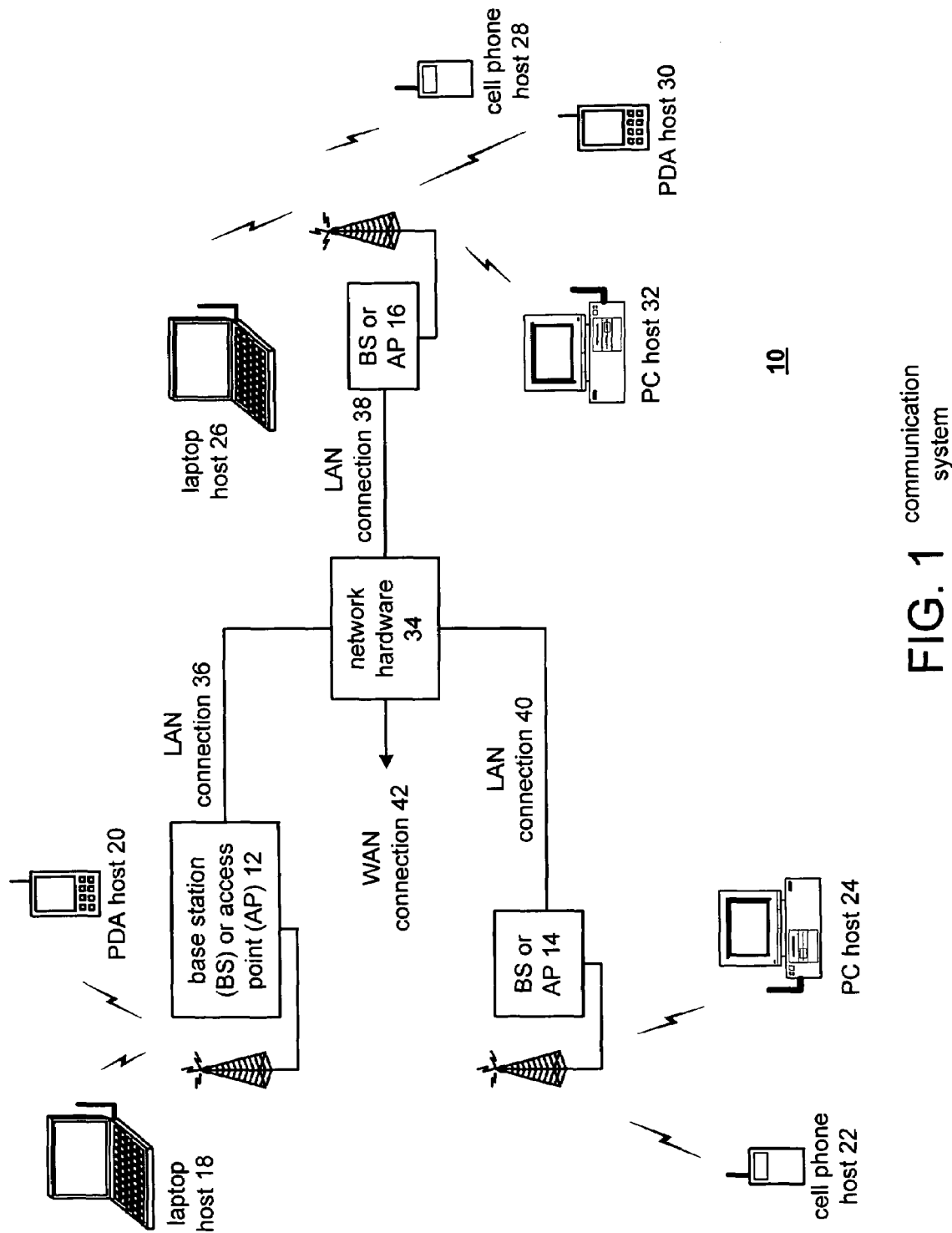
FIG. 1 is a functional block diagram illustrating a communication system that includes a plurality of base stations and/or access points, a plurality of wireless communication devices and a network hardware component.

FIG. 1 is a functional block diagram illustrating a communication system 10 that includes a plurality of base stations or access points (AP) 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2. In one embodiment of the present invention, every access point 12-16 and every wireless communication device 18-32 that is operable to communicate in the radar bands described herein is capable of detecting radar signals and to cease communicating in radar bands so long as a signal is present. In an alternate embodiment of the invention, the various access points 12-16 are capable of detecting a radar and further to communicate with any of the wireless communication devices 18-32 to prompt the wireless communication devices 18-32 to cease transmitting in the radar band in which radar is detected. Accordingly, one or more of the wireless communication devices 18-32 is operable to cease communications in the radar band based upon the received prompt from the wireless communication device 12-16.

The base stations or AP 12-16 are operably coupled to the network hardware component 34 via local area network (LAN) connections 36, 38 and 40. The network hardware component 34, which may be a router, switch, bridge, modem, system controller, etc., provides a wide area network connection 42 for the communication system 10. Each of the base stations or access points 12-16 has an associated antenna or antenna array to communicate with the wireless communication devices in its area. Typically, the wireless communication devices 18-32 register with the particular base station or access points 12-16 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio.

Figure 2:
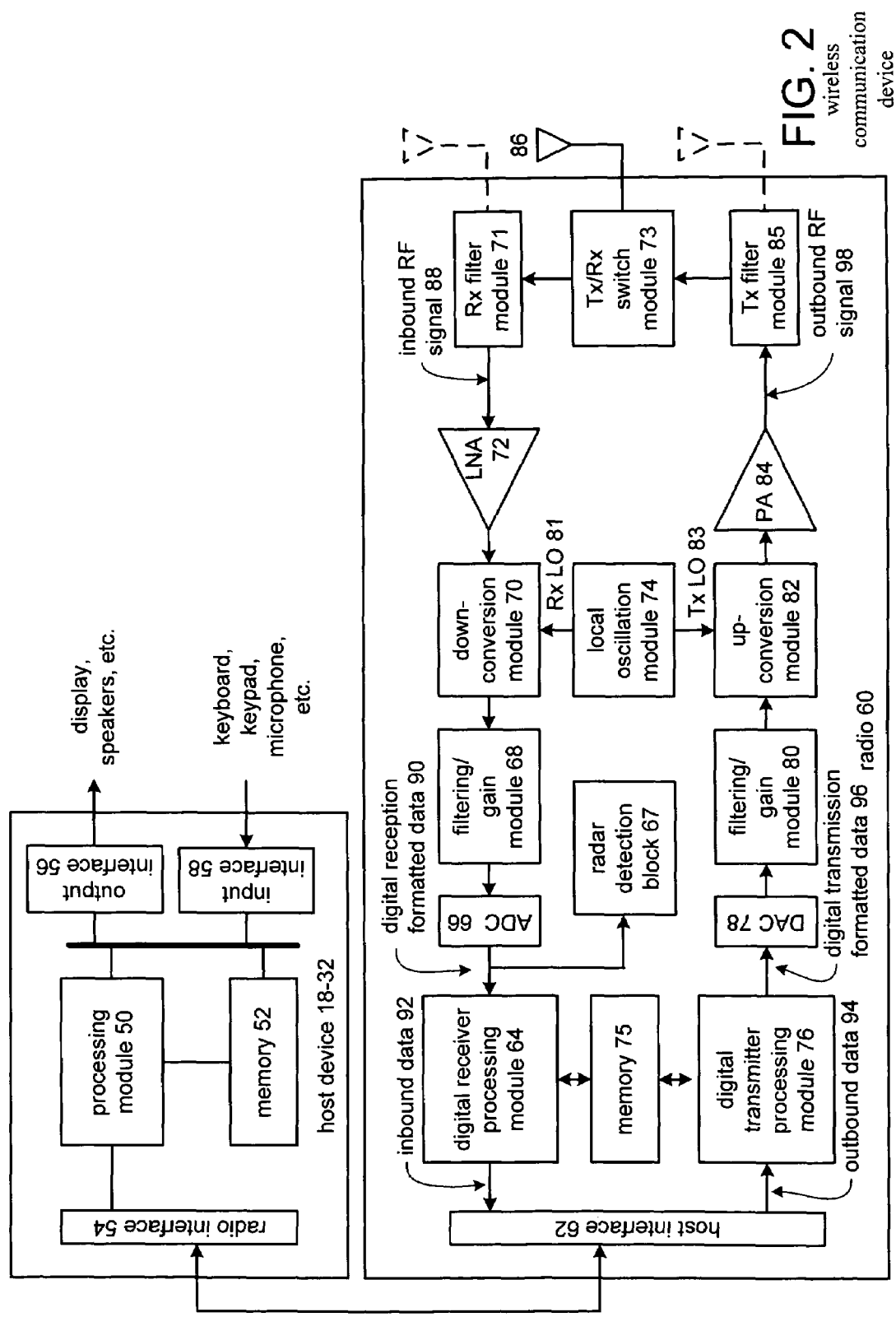
FIG. 2 is a schematic block diagram illustrating a wireless communication device as a host device and an associated radio.

FIG. 2 is a schematic block diagram illustrating a wireless communication device 18-32 as a host device and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host wireless communication device 18-32 includes a processing module 50, a memory 52, a radio interface 54, an input interface 58 and an output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output device such as a display, monitor, speakers, etc., such that the received data may be displayed. The radio interface 54 also provides data from the processing module 50 to the radio 60. The processing module 50 may receive the outbound data from an input device such as a keyboard, keypad, microphone, etc., via the input interface 58 or generate the data itself. For data received via the input interface 58, the processing module 50 may perform a corresponding host function on the data and/or route it to the radio 60 via the radio interface 54.

Radio 60 includes a host interface 62, a digital receiver processing module 64, an analog-to-digital converter 66, a radar detection block 67, a filtering/gain module 68, a down-conversion module 70, a low noise amplifier 72, receiver filter module 71, a transmitter/receiver (Tx/Rx) switch module 73, a local oscillation module 74, a memory 75, a digital transmitter processing module 76, a digital-to-analog converter 78, a filtering/gain module 80, an IF mixing up-conversion module 82, a power amplifier 84, a transmitter filter module 85, and an antenna 86. The antenna 86 is shared by the transmit and receive paths as regulated by the Tx/Rx switch module 73. The antenna implementation will depend on the particular standard to which the wireless communication device is compliant.

The radar detection block 67 is operable to receive a digital low frequency signal from ADC 66 and to process such digital low frequency signal to determine whether a radar signal is present. Radar detection block 67, upon detecting a radar signal, prompts radio 60 to inhibit communications in frequency bands that overlap with radar and, in the case of ongoing communications, to switch outgoing communications to a non-overlapping frequency band (non-overlapping with radar).

The digital receiver processing module 64 and the digital transmitter processing module 76, in combination with operational instructions stored in memory 75, execute digital receiver functions and digital transmitter functions, respectively. The digital receiver functions include, but are not limited to, demodulation, constellation demapping, decoding, and/or descrambling. The digital transmitter functions include, but are not limited to, scrambling, encoding, constellation mapping, modulation. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the digital receiver processing module 64 and/or the digital transmitter processing module 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory 75 stores, and the digital receiver processing module 64 and/or the digital transmitter processing module 76 executes, operational instructions corresponding to at least some of the functions illustrated herein.

In operation, the radio 60 receives outbound data 94 from the host wireless communication device 18-32 via the host interface 62. The host interface 62 routes the outbound data 94 to the digital transmitter processing module 76, which processes the outbound data 94 in accordance with a particular wireless communication standard (e.g., IEEE 802.11a, IEEE 802.11b, Bluetooth, etc.) to produce digital transmission formatted data 96. The digital transmission formatted data 96 will be a digital baseband signal or a digital low IF signal, where the low IF typically will be in the frequency range of one hundred kilohertz to a few megahertz.

The digital-to-analog converter 78 converts the digital transmission formatted data 96 from the digital domain to the analog domain. The filtering/gain module 80 filters and/or adjusts the gain of the analog baseband signal prior to providing it to the up-conversion module 82. The up-conversion module 82 directly converts the analog baseband signal, or low IF signal, into an RF signal based on a transmitter local oscillation 83 provided by local oscillation module 74. The power amplifier 84 amplifies the RF signal to produce an outbound RF signal 98, which is filtered by the transmitter filter module 85. The antenna 86 transmits the outbound RF signal 98 to a targeted device such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the receiver filter module 71 via the Tx/Rx switch module 73, where the Rx filter module 71 bandpass filters the inbound RF signal 88. The Rx filter module 71 provides the filtered RF signal to low noise amplifier 72, which amplifies the inbound RF signal 88 to produce an amplified inbound RF signal. The low noise amplifier 72 provides the amplified inbound RF signal to the down-conversion module 70, which directly converts the amplified inbound RF signal into an inbound low IF signal or baseband signal based on a receiver local oscillation signal 81 provided by local oscillation module 74. The down-conversion module 70 provides the inbound low IF signal or baseband signal to the filtering/gain module 68. The filtering/gain module 68 may be implemented in accordance with the teachings of the present invention to filter and/or attenuate the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host wireless communication device 18-32 via the radio interface 54.

As one of average skill in the art will appreciate, the wireless communication device of FIG. 2 may be implemented using one or more integrated circuits. For example, the host device may be implemented on a first integrated circuit, while the digital receiver processing module 64, the digital transmitter processing module 76 and memory 75 are implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver processing module 64 and the digital transmitter processing module 76 may be a common processing device implemented on a single integrated circuit. Further, memory 52 and memory 75 may be implemented on a single integrated circuit and/or on the same integrated circuit as the common processing modules of processing module 50, the digital receiver processing module 64, and the digital transmitter processing module 76.

The wireless communication device of FIG. 2 is one that may be implemented to include either a direct conversion from RF to baseband and baseband to RF or for a conversion by way of a low intermediate frequency. In either implementation, however, for an up-conversion module 82 and a down-conversion module 70, it is required to provide accurate frequency conversion. For the down-conversion module 70 and up-conversion module 82 to accurately mix a signal, however, it is important that the local oscillation module 74 provide an accurate local oscillation signal for mixing with the baseband or RF by the up-conversion module 82 and down-conversion module 70, respectively. Accordingly, the local oscillation module 74 includes circuitry for adjusting an output frequency of a local oscillation signal provided therefrom. As will be explained in greater detail, below, the local oscillation module 74 receives a frequency correction input that it uses to adjust an output local oscillation signal to produce a frequency corrected local oscillation signal output. While one embodiment of the present invention includes local oscillation module 74, up-conversion module 82 and down-conversion module 70 that are implemented to perform direct conversion between baseband and RF, it is understand that the principles herein may also be applied readily to systems that implement an intermediate frequency conversion step at a low intermediate frequency.

Figure 3:
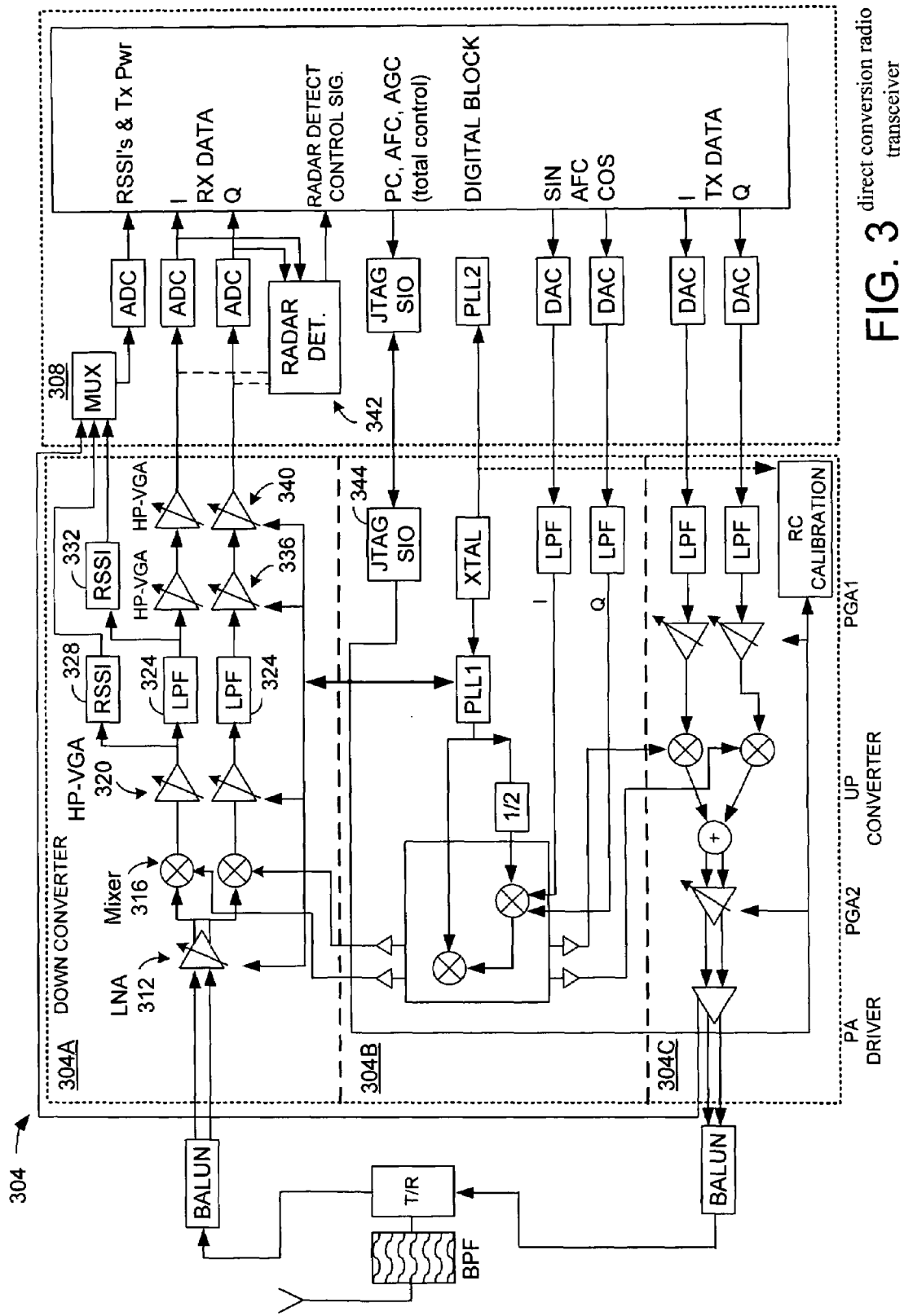
FIG. 3 is a functional schematic diagram of a direct conversion radio transceiver formed according to one embodiment of the present invention.

FIG. 3 is a functional schematic diagram of a direct conversion radio transceiver formed according to one embodiment of the present invention. Referring now to FIG. 3, a transceiver system comprises radio circuitry 304 that is coupled to baseband processing circuitry 308. The radio circuitry 304 performs filtering, amplification, frequency calibration (in part) and frequency conversion (down from the RF to baseband and up from baseband to the RF). Baseband processing circuitry 308 performs the traditional digital signal processing in addition to partially performing the automatic frequency control. As may be seen, the single chip radio circuitry 304 is coupled to receive radio signals that are initially received by the transceiver and then converted by a Balun signal converter, which performs single end to differential conversion for the receiver (and differential to single end conversion for the transmitter end). The Balun signal converters are shown to be off-chip in FIG. 3, but they may be formed on-chip with radio circuitry 304 as well. Similarly, while the baseband processing circuitry 308 is shown off-chip, it also may be formed on-chip with radio circuitry 304.

Radio circuitry 304 and, more particularly, circuitry portion 304A, includes a low noise amplifier 312 that is coupled to receive RF signals from a transceiver port. The low noise amplifier 312 then produces an amplified signal to mixers 316 that are for adjusting and mixing the RF with a local oscillation signal. The outputs of the mixers 316 (I and Q components of quadrature phase shift keyed signals) are then produced to a first HP-VGA 320.

The outputs of the first HP-VGA 320 are then produced to a first RSSI 328 as well as to a low pass filter 324. The outputs of the low pass filter 324 are then produced to a second RSSI 332, as well as to a second HP-VGA 336 and a third HP-VGA 340 as may be seen in FIG. 3. The outputs of HP-VGA 340 are then produced to a pair of analog-to-digital converters. The analog-to-digital converters then produce digital data to both radar detection block 342 and a digital block for processing.

Radar detection block 342 is operable to monitor incoming signals and determine when a radar signal is present. In one embodiment, radar detection block 342 produces an indication that a radar is present (shown as RADAR DETECT CONTROL SIG. in FIG. 3) to the digital block which the takes specified actions including suspending transmissions in overlapping radar channels. It is understood that the RADAR DETECT CONTROL SIG. may merely be a binary control signal in one embodiment to prompt the digital block to inhibit transmission or it may be pulse data where logic within the digital block evaluates the pulse data to determine whether a radar has been detected. Moreover, as may be seen, radar detection block 342 receives digital low frequency signals from the ADCs. In an alternate embodiment, however, the radar detection block includes its own set of ADCs and receives low frequency analog signals from the inputs of the ADC. Such alternate embodiment may be implemented as a matter of design choice.

First RSSI 328 measures the power level of the signal and interference. The second RSSI 332 measures the power level of the signal only. The baseband processing circuitry 308 then determines the ratio of the RSSI measured power levels to determine the relative gain level adjustments of the front and rear amplification stages. In the described embodiment of the invention, if the power level of the signal and interference is approximately equal to or slightly greater than the power level of the signal alone, then the first amplification stages are set to a high value and the second amplification stages are set to a low value. Conversely, if the power level of the signal and interference is significantly greater than the power of the signal alone, thereby indicating significant interference levels, the first amplification stages are lowered and the second amplification stages are increased proportionately.

Circuitry portion 304B includes low pass filters for filtering I and Q component frequency correction signals and mixer circuitry for actually adjusting LO signal frequency. The operation of mixers and phase locked loop for adjusting frequencies is known. Circuitry portion 304B further includes JTAG (Joint Test Action Group, IEEE1149.1 boundary-scan standard) serial interface (SIO) circuitry 344 for transmitting control signals and information to circuitry portion 304A (e.g., to control amplification levels) and to a circuitry portion 304C (e.g., to control or specify the desired frequency for the automatic frequency control).

A portion of the automatic frequency control circuitry that determines the difference in frequency between a specified center channel frequency and an actual center channel frequency for a received RF signal is formed within the baseband circuitry in the described embodiment of the invention. This portion of the circuitry includes circuitry that coarsely measures the frequency difference and then measures the frequency difference in the digital domain to obtain a more precise measurement and to produce frequency correction inputs to circuitry portion 304B.

Finally, radio circuitry portion 304C includes low pass filtration circuitry for removing any interference that is present after baseband processing as well as amplification, mixer and up-converter circuitry for preparing a baseband signal for transmission at the RF.

FIG. 4 is a functional schematic diagram of an automatic frequency control (AFC) circuit formed according to one described embodiment of the invention. The AFC circuit of FIG. 4 comprises an RF signal processing portion 360 and a baseband signal processing portion 362. Generally, portion 360 is for adjusting an LO signal frequency. Portion 362 is for determining the difference in center channel frequencies between the received RF and the expected frequency value for the received signal.

An analog-to-digital converter (ADC) 364 is used to convert the received signal from analog to digital. ADC 364 is coupled to receive an RF signal that has been down-converted to produce a digitally converted signal to frequency synchronization circuitry 368 that measures the frequency difference in a coarse degree of resolution. Digital frequency control circuitry 366 performs its measurements and calibration in the digital domain and provides its results to frequency synchronization circuitry 368 to adjust the frequency difference of frequency synchronization circuitry 368 with a fine degree of resolution.

Frequency synchronization circuitry 368, as a part of determining the difference in center channel frequency for the received signal and an expected value, receives and interprets a pilot signal that defines the expected center channel frequency. Accordingly, after measuring the actual center channel frequency of the received RF, frequency synchronization circuitry 368 is able to determine the frequency difference. Frequency synchronization circuitry 368 then produces a signal defining the difference in center channel frequency for the received signal and an expected value to a signal generator 370. It is understood that the pilot channel is transmitted as a part of standard wireless network communication protocols for signal control and synchronization purposes.

Signal generator 370, upon receiving the difference in center channel frequency for the received signal and an expected value, produces quadrature phase shift keyed (I and Q) outputs for the received frequency difference (reflecting a frequency adjustment amount) to a pair of digital-to-analog converters (DACs) 372. The analog outputs of the pair of DACs 372 are then passed to low pass filters 374 and are then up-converted to the RF. The I and Q RF signal components are then produced to mixer circuitry 376 that also receives a specified input from phase locked loop (PLL) circuitry 378 to produce a received RF having a specified center channel frequency. It is understood that mixer circuitry 376 (including PLL circuitry 378) further receives control signals from baseband processing circuitry (not shown in FIG. 4) specifying the expected center channel frequency that is specified in the aforementioned pilot channel.

FIG. 5 is a diagram that illustrates the relative difference between a radar signal waveform and an 802.11 wireless LAN waveform signal. Generally, it may be seen that radar signal pulses have a significantly higher magnitude than the 802.11 wireless LAN waveform signal. Additionally, radar pulses have a much shorter pulse width. In the example shown, each radar pulse has a 1 microsecond pulse width and is spaced apart by approximately 1 millisecond (though the figure is not to scale). The 802.11 wireless LAN waveform signal, in contrast, has a period that equals at least 40 microseconds and can equal 3 milliseconds. Thus, the waveform of the radar pulses and the 802.11 wireless LAN signal are notably different, however, which facilitates detection by a radar detection block as disclosed herein.

Continuing to examine FIG. 5, it may be noted that the radar pulses come in blocks. While 5 pulses per block are shown, it is understood that each block of pulses may have a different number of pulses. Generally, the radar pulses are in the 5.25-5.75 GHz frequency band having a 1 to 10 MHz bandwidth. The 802.11 frequency bands that are approximate to the frequency band of radar range from 5.15-5.35 MHz and from 5.725-5.825 MHz. Accordingly, it may be seen that an overlap exists between these two frequency bands for 802.11 with the frequency band for the radar pulses.

FIG. 6 is a diagram illustrating two groups (blocks) of pulses of a radar signal. Generally, it is a goal to detect a radar signal before a second group of pulses is received. Accordingly, as may be seen for the first group of pulses, a radar detection block, and more particularly, a state machine of the radar detection block in conjunction with a processor, must be able to detect and determine that a radar signal is present from the five pulses shown of the first group of pulses in FIG. 6. As is understood, a common characteristic of radars is that the radar antenna oscillates or rotates thereby radiating any one point in space only for a limited time while the point in space is within a beam angle of the radar antenna. Accordingly, even though the radar continuously produces radar pulses, they are seen by the receiver in groups and are not seen as the radar antenna sweeps away.

As may further be seen, a plurality of threshold levels is defined. These threshold levels are used by the state machine and the processor to determine that the radar signal is present. The logic for concluding that a radar signal is present in relation to the pulses will be described in greater detail below. Generally, it may be seen that the first threshold level ($TH_0$), in one embodiment of the invention, is defined to be within the range of −80 decibels per meter (dBm) relative to a milliwatt. A second threshold ($TH_1$) is defined at −63 dBm.

The thresholds $TH_0$ and $TH_1$ are chosen in order to meet the requirements for radar detection sensitivity and to avoid false alarms and thus may be modified so long as this design goal is considered for a particular radar having known signal characteristics. In a first embodiment, absolute thresholds are used. The choice of $TH_0$ is made by first estimating the probability of detection and probability of false alarm for the expected environment. In an ideal environment (known radar signals in additive white Gaussian noise (AWGN) the computation is straightforward. However, in practice, the thresholds will be adjusted in the described embodiments of the invention in a dynamic fashion in order to maximize radar detection performance.

FIG. 7 is a diagram that illustrates the measurement of rise time and fall time of the pulses of the radar signal. More specifically, a time to is defined as being when a rising pulse crosses the first threshold $TH_0$. A second time value $t_1$ is defined when the pulse crosses the second threshold $TH_1$. A third time period is defined, $t_2$, as being the time when a falling pulse crosses the $TH_1$ threshold. Finally, a fourth time is defined as $t_3$ whenever the falling pulse crosses threshold $TH_0$. By measuring the rise and fall times, the state machine and processor executed logic, in the described embodiment, may better determine whether a radar pulse was detected. The logic portion performed by the processor may also be implemented with hardware such as application specific integrated computer logic, field programmable gate array logic, etc. These crossings of $TH_0$ and $TH_1$ enable a processor, state machine or other logic performing pulse detection operations to measure a rise time, a fall time, a pulse width and a total signal period. These measured signal characteristics make up what is referred herein also as pulse information that is entered within a table for evaluation to facilitate determination as to whether a radar signal is present.

FIG. 8 is a functional block diagram of a portion of a radio transceiver 400 according to one embodiment of the present invention. Initially, an RF signal received at an antenna is coupled to a low noise amplifier 402. Low noise amplifier 402 produces amplified RF to mixers 404 and 406. Mixer 404 mixes the amplified RF with a local oscillation to down-convert the RF to a baseband frequency signal to create a down-converted I channel signal. Similarly, mixer 406 mixes the received amplified RF signal with a phase shifted local oscillation, wherein the phase is shifted by 90°, to produce a down-converted Q channel signal. Low pass filters 408 and 410 are coupled to receive the down-converted I and Q channel signals, respectively, to produce filtered I and Q channel signals to a pair of variable gain amplifiers 412 and 414, respectively. Variable gain amplifiers 412 and 414 further receive gain control signals from an 802.11a physical layer digital signal processor 416. Responsive to the gain control from processor 416, variable gain amplifiers 412 and 414 provide a corresponding amount of gain to the filtered I and Q signals and produce amplified I and Q signals to analog-to-digital converters 417 and 418. Analog-to-digital converters 417 and 418 then convert the amplified I and Q signals to digital to produce incoming I and Q digital signal streams to processor 416.

Radio transceiver 400 of FIG. 8 further includes a radar detection block 420 that is coupled to receive the incoming I and Q digital signal streams to detect the presence of a radar signal. Upon detecting the presence of a radar signal, radar detection block 420 produces control signals to processor 416 to prompt processor 416 to suspend communications over frequency bands that overlap with the radar frequency bands. The operation and structure of radar detection block 420 is described in greater detail below.

Figure 9:
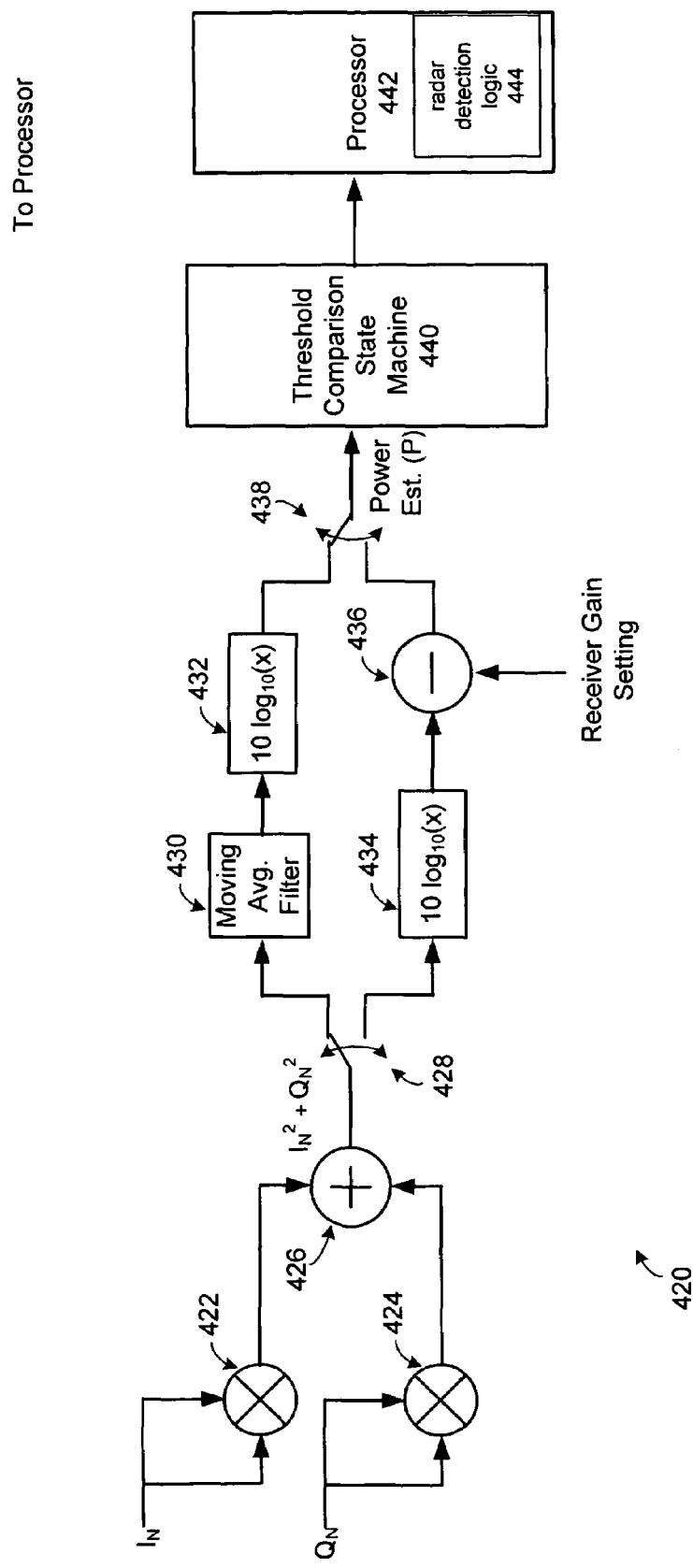
FIG. 9 is a functional block diagram of a radar detection block for use in an 802.11a receiver formed according to one embodiment of the present invention.

FIG. 9 is a block diagram of a radar detector block for use in an 802.11a receiver according to one embodiment of the invention. This corresponding 802.11a receiver for the radar block of FIG. 9 is a direct conversion type receiver, although the invention is applicable to a super-heterodyne receiver as well. (Both are commonly used for 802.11 type wireless LANs.) The inputs to the radar detection block of FIG. 9 are the outputs of the analog-to-digital converters (ADCs) that are tapped off and produced to the radar detection circuit (as shown in FIG. 8, for example). The input signals produced by the ADCs are digital signals that are sampled at a sufficient rate and with a sufficient number of bits to facilitate use for radar detection. For example, a 40 MHz sampling rate at 8 bits of precision is adequate to detect radar systems in an 802.11a environment.

As was shown in relation to FIG. 8, radar detection block 420 received the incoming I and Q digital signal streams produced by ADC 417 and ADC 418. As may be seen in FIG. 9, the incoming I and Q digital signal streams are received by mixers 422 and 424. Mixers 422 and 424 are operatively coupled to receive each of the incoming I and Q digital signal streams twice to square each of the incoming I and Q digital signal streams. Accordingly, mixer 422 produces a squared I digital signal stream, while mixer 424 produces a squared Q digital signal stream. The squared I and Q digital signal streams are then produced to an adder 426 that sums the two squared signals to produce a summed I and Q squared signal stream to a switch 428.

In a first position, the summed I and Q squared signal stream is produced to moving average filter 430 that calculates a moving average of the summed I and Q squared signal stream. Moving average filter 430 then produces a moving average value to decibel conversion block 432, which converts the moving average value produced by filter 430 to decibel units.

Whenever switch 428 couples moving average filter 430 to adder 426, a switch 438 couples the output of decibel conversion block 432 to a threshold comparison state machine 440. Accordingly, the moving average, in decibels, is produced to threshold comparison state machine 440 for analysis as will be described below. Whenever switch 428 couples adder 426 to a decibel conversion block 434, however, the summed I and Q squared signal stream is produced to decibel conversion block 434 which produces the summed I and Q squared signal stream in decibels to a subtractor 436. Subtractor 436 is further coupled to receive and subtract a receiver gain setting from the summed I and Q squared signal stream in decibels. The output of subtractor 436 is then coupled, by switch 438, to threshold comparison state machine 440. Threshold comparison state machine 440 operates as described below to provide preliminary analysis of the detected power levels produced either by decibel conversion block 432 or subtractor 436 to a processor 442. Radar detection logic 444 within processor 442, then analyzes the preliminary analysis received from threshold comparison state machine 440 to determine whether a radar signal has been received.

This circuit of FIG. 9 computes the received power and applies either no filtering (option 1 in which both switches are in the low position) or a moving average filter (option 2 in which both switches are in the upper position). Option 1 is most effective for short pulse width radars when no interference is present. Option 2 is most effective with longer radar pulses in interference that looks random as is shown in FIG. 10.

FIG. 10 is an illustration of signal waveforms for radar pulses and 802.11a signals. In general, the radar detector will not have prior information concerning either the radar pulse width or interference. Consequently, in the described embodiment, logic drives switches 428 and 438 to the lower position (option 1) unless an 802.11a frame is being received (as determined during call setup signaling between an access point and a wireless host or communication device in one embodiment of the invention). In the case of 802.11a communications, option 2 is employed (the switches are toggled to the upward position as shown) during the duration of the frame.

When option 2 is employed during a received 802.11a frame, the thresholds are set to be relative to the average received power. Since the radar signal is typically a constant envelope signal, while the interference is more like Gaussian noise, the moving average filter will have the effect of improving the radar signal to interference power ratio by a factor of the square root of the filter length. The improvement is limited by the length of the radar pulse (i.e., maximum improvement is when the radar pulse fills the moving average filter). Thus, the threshold level and filter length are jointly selected based on the expected radar pulses length and the detection and false alarm probabilities.

FIG. 11 is a functional block diagram of a moving average block as employed in one embodiment of the present invention. The moving average filter effectively is an integrator and can improve the radar signal to interference level for many types of radar signals. In the described embodiment, four delay elements 446 are included coupled in series and having outputs that are further produced to an adder. A summed output from the adder is then produced to a divide by "N" block 448. The value of "N" in the divide-by-N block is equal to four in the described embodiment since there are four delay elements. The number of delay elements and the divisor "N" may each be modified according to particular requirements.

If it is assumed that the radar signal has a constant envelope, the I and Q components then take the form:

$$I(n) = A_r \cos(\overline{\omega}_r nT + \phi)$$

$$Q(n) = A_r \sin(\overline{\omega}_r nT + \phi)$$

where $A_r$, the radar signal amplitude, and $\omega_r$, the down-converted radar signal frequency, are constant (or approximately constant) during the radar pulse. The radar signal is zero outside of the received pulse. In constrast, the received 802.11a signal can be modeled as two Gaussian signals:

$$I(n) = G_i(n)$$

$$Q(n) = G_q(n)$$

The moving average filter of length n computes the following:

$$y = \sum_{i=1}^{k} I_i^2 + Q_i^2$$

With an input signal that is composed of a radar signal embedded within an 802.11a frame, the output of the moving average filter is:

$$I(n) = A_r \cos(\varpi_r nT + \varphi) + G_i(n)$$

$$Q(n) = A_r \sin(\varpi_r nT + \varphi) + G_q(n)$$

$$y = \sum_{i=1}^{k} A_r^2 (\cos^2(\varpi_r iT + \varphi) + \sin^2(\varpi_r iT + \varphi)) +$$

$$A_r \cos(\varpi_r iT + \varphi) G_i(i) + G_i^2(i) + A_r \sin(\varpi_r, iT + \varphi) G_q(i) + G_q^2(i)$$

$$y = kA_r^2 + \sum_{i=1}^{k} A_r \cos(\varpi_r iT + \varphi) G_i(i) + G_i^2(i) + A_r \sin(\varpi_r iT + \varphi) G_q(i) + G_q^2(i)$$

With the radar and signal model given above, y has a non-central chi-square distribution with 2 k degrees of freedom. Thus, the relative error in the measurement of y is given by:

$$\text{Relative Error} = (\text{standard deviation of } y)/(\text{mean of } y)$$
$$= \frac{\sigma_y}{m_y}$$
$$= \frac{\sqrt{4k\sigma_{wlan}^4 + 4kA_r^2\sigma_{wlan}^2}}{2k\sigma_{wlan}^2 + kA_r^2}$$

which decreases by a factor of the square root of k with increasing k.

FIG. 12 illustrates a threshold comparison state machine. This device measures the time instants when the radar pulse crosses two thresholds. The output takes the form of 4 time measurements: start time ($T_0$), rise time ($T_1$), pulse width ($T_2$), and fall time ($T_3$). A set of the 4 time measurements is recorded for every complete cycle back to start.

The state machine operates as follows. It originates in the start state and observes the incoming power estimate P. When P exceeds threshold $P_0$, the start time ($T_0$) is recorded and the state is advanced to Rising0. Once in Rising0, a counter is initiated to record the total time in that state ($T_1$). If the incoming power estimate drops below $P_0$, then the state machine is reset and it returns to Start. As described herein, $P_0$ and $P_1$ represent two threshold values used to identify a typical radar pulse. For example, the values of $P_0$ and $P_1$ may be set to $TH_0$ and $TH_1$ of FIGS. 6 and 7.

When P exceeds the second threshold, $P_1$, the state machine advances to state Rising1. The time it spends in this state is recorded in T2. When P drops below $P_1$, the state machine advances to Falling0. The time in this state is recorded in $T_3$. If, while in the Falling0 state, P rises back up to $P_1$, then the state machine returns to the Rising1 state. $T_2$ is then incremented by the contents of $T_3$ and $T_3$ is reset. This process of moving back and forth between the Rising1 and Falling0 states can happen multiple times. After P drops below $P_0$, the state machine returns to Start and the complete set of 4 time measurements are forwarded to the processor.

The final radar detection decision is made by a programmable processor as shown in the embodiment of FIG. 9. In the embodiment of FIG. 8, however, the final radar detection decision may be made either in the processor or in radar detection block 420. Referring again to FIG. 9, processor 442, and more particularly, radar detection logic 444, periodically reviews the pulse data collected by the state machine 440, and compares it with the characteristics of known radar signals. One key characteristic for determining radar presence, however, is the pulse repetition frequency. Thus, the processor is operable to match multiple received pulses with the same relative spacing. When a sequence of this type is observed, detection is declared. Otherwise, the pulse data is discarded, and the processor waits for new data. This multi-layer approach helps minimize false detections, while maximizing the chances that actual radars are detected.

In the described embodiment of the invention, a processor receives the output of the state machine and logic defined therein (in radar detection block 444 of FIG. 9, for example) analyzes the output of the state machine to determine whether a radar signal has been received. It should be understood that the following logic, as defined in block 444 and executed by processor 442, may readily be formed in hardware as described before.

The embodiments of the invention include a sequence of steps that are typically executed on a programmable processor. FIG. 13 is a flowchart that illustrates a series of steps that are performed according to one embodiment of the invention. Generally, the invention includes measuring signal characteristics to determine if a received signal has a characteristic of a radar pulse and to further determine whether a pattern of pulses is consistent with a radar pattern. More specifically, the invention includes determining whether a received signal has exceeded a first threshold (step 450) and, when the first threshold is exceeded, a timer is initiated to track or measure a rise time (step 452). The time is turned off and the rise time is determined when the rising signal crosses a second threshold. Thus, the invention includes determining that the received signal has crossed the second threshold (step 454).

The invention further includes determining a pulse width. Thus, once the second threshold has been reached, the invention includes initiating a second timer to measure an amount of time above the second threshold (and therefore the pulse width) (step 456). The invention further includes determining a received signal has fallen below the second threshold (step 458). The difference in time between the two crossings of the second threshold define the pulse width of a received signal. If the second timer is initialized to start counting from zero, the value of the second timer represents the pulse width.

Once the second threshold is crossed in a downward position, meaning the received signal levels has crossed from above to below the second threshold, a third timer is initialized to track a fall time (step 460). Once the signal crosses the first threshold in the downward direction, the third timer is stopped and the fall time is determined (step 462), which fall is the time required for the signal level to fall from the second to the first threshold. Accordingly, the invention further includes producing first, second and third timer values to logic for determining whether a radar pulse has been received (step 464). Finally, if a radar pulse has been received, the method of the embodiment of the invention includes stopping all transmissions in frequency bands that overlap with radar frequency bands (step 466).

FIG. 14 is a flowchart illustrating a method for determining whether a radar signal is present according to one embodiment of the invention. For the described embodiment, it is assumed hardware of a radio receiver is continually filling a first in/first out (FIFO) with the pulse information. Moreover, in the described embodiment of the invention, the inventive method is repeated at periodic intervals of less than one second.

Initially, the invention includes receiving and detecting incoming pulses and placing the pulse information in a FIFO register (step 470). Detecting the incoming pulses includes measuring pulse characteristics such as rise time, pulse width and fall time. Thereafter, the invention includes producing pulse information to a processor and clearing the FIFO (step 472). Generally, this step includes loading pulse data (pulse information) into the programmable processor (in the described embodiment) or other logic. In one embodiment, the pulse data is loaded by direct transfer such as by direct memory access (DMA).

After the pulse data is loaded, a table of pulse data is generated for a series of pulses (step 474). If the total number of pulses is less than a specified number, processing is suspended (stopped) until the specified number of pulses is listed within the table (step 476). In addition to adding pulse data to the table, the invention includes removing pulse information from the generated table for any pulse having a pulse width less than a specified minimum width amount and greater than a specified maximum width amount (step 478). In an alternate embodiment, pulse data is only placed within the table for further analysis if the pulse width is within a specified range for a given pulse. Accordingly, for this embodiment, the step of removing pulse data for such a pulse is unnecessary. In either embodiment, however, pulses that are either too long or too short to be a radar pulse are removed from the table of pulse data entries. Typical radar systems have pulses with a pulse width in the range of one to three microseconds.

The invention further includes determining whether a total number of pulses is less than a specified number and, if so, stops further processing until the table has pulse data for a specified number of pulses (step 480). In one embodiment of the invention, the specified number is equal to six. Thereafter, the invention includes grouping a plurality of pulse data entries to enable detection of a specified radar pulse (step 482). In the described embodiment, the group of pulses are grouped by time. More specifically, a nominal value of 210 milliseconds is used to group pulses. In the very specific embodiment, such a grouping is referred to as an epoch. The epoch or group length is set to be long enough to perform radar detection processing (step 484) and to cover the burst lengths sufficiently long to detect desired radar systems. This step takes advantage of a radar characteristic of radar systems of pulses being transmitted and arriving in bursts. Although it is not known exactly how long the bursts will be for a radar, the nominal value of 210 milliseconds should be adequately long to facilitate identifying a received radar signal. Finally, if a radar pulse has been received, the invention includes inhibiting or stopping transmission in frequency bands that overlap with radar frequency bands (step 486).

FIG. 15 is a flowchart of a method for performing radar detection processing. In some cases, it is expected that a valid radar may not be detected due to interference with one or more pulses. Accordingly, the group of pulses for which no radar was detected is evaluated for a missing pulse. Thus, for the grouped plurality of pulse information entries (epoch), the invention includes generating a first list of pulse repetition intervals by subtracting a start time for a given pulse from a start time for an immediately preceding pulse for each pulse in the group (step 490). It is understood, of course, that this step cannot be performed for the first pulse. Thereafter, the invention includes quantizing pulse repetition intervals with a specified granularity (step 492). Generally, received pulse data has a degree of resolution that is not necessary and may result in false determinations regarding radar detection conclusions. In one embodiment of the invention, the data is quantized to a resolution of 25 milliseconds and a smallest incremental value. Thereafter, the invention includes removing all pulses not having a pulse repetition interval value within a specified range (step 494). If the total number of pulses is less than a specified number (six in the described embodiment) the process is stopped and is repeated for a subsequent grouped plurality of pulse information entries (step 496).

Once a group of pulses (epoch in the described embodiment) contains a group of pulses that is equal to or exceeds the specified number of required pulses (six in the described embodiment), the invention includes determining (by counting) which pulses have the most common and second most common pulse interval values in the group of pulse information entries (step 498). The method further includes determining if a total number of most common pulse interval values is greater than or equal to the specified number and therefore determining that a radar pulse has been detected (step 500). If the pulse train (group of pulses) does not suggest radar presence, the invention includes examining the pulse train to determine if the pulse train is missing a radar pulse (step 502).

The specific steps for determining that a radar is present notwithstanding a missing pulse is illustrated in relation to FIG. 16.

If analysis of the pulse train for missing radar pulses does not suggest radar presence, the invention includes examining the pulse train to determine if the pulse train includes an extra radar pulse (step 504). If a radar pulse is detected in any one of the prior steps, the invention further includes suspending transmission in overlapping frequency bands and classify radar by comparing frequency of pulses from first list of pulse repetition intervals to known radar signals (step 506). Finally, the invention includes continuing monitoring for radar and, once a radar signal is determined to not be present, resuming transmission of communication signals in overlapping frequency bands (radar bands) (step 508).

FIG. 15 illustrated a method for determining whether a radar signal is present and whether transmissions in overlapping frequency bands should be suspended. Within the steps of FIG. 15, there are two steps for determining whether a radar is present even if a pulse is missing (for example, due to interference) or if there is an extra pulse (for example, due to spurious noise or other noise source) in steps 504 and 506, respectively. Each of these two steps, however, further includes a series of steps for determining the same.

FIG. 16 is a flowchart illustrating a method for performing radar detection processing for missing pulses. FIG. 17 is a flowchart illustrating a method for performing radar detection processing for extra pulses. Referring now to FIG. 16, the method includes evaluating whether a 2*pulse interval of a most common pulse interval value is equal to a pulse interval of a second most common pulse interval value (step 510). Additionally, the invention includes evaluating whether the 2*pulse interval of the second most common pulse interval value is equal to the pulse interval of the most common pulse interval value (step 512). Also, the invention includes determining if the total number of most common and second most common pulses is greater than the specified number (step 514). Finally, the invention includes determining that a radar pulse is present if any of the above three steps are true (step 516). Generally, if any of these steps yields a true result, then a radar is present and detectable even if interference prevents receipt of a radar pulse.

Another type of interference is the introduction of a signal that appears to be a pulse. Thus, referring now to FIG. 17, the inventive method includes analysis for determining a radar signal is present even in the presence of an extra signal appearing as a pulse. More specifically, the invention includes for a grouped plurality of pulse information entries, generating a second list of pulse repetition intervals by subtracting a start time for a given pulse from a start time for a pulse preceding an immediately preceding pulse (step 518). Thereafter, the pulse repetition intervals are quantized with a specified granularity (step 520). The invention further includes removing all pulses not having a pulse repetition interval value within a specified range (step 522). The remaining pulse intervals of a first list of pulse repetition intervals are then compared to the second list of pulse repetition intervals (step 524). Finally, the invention includes evaluating whether if pulse periods match from the comparison, and if the total number of pulses in the second list of pulse repetition intervals is greater than a specified number, determining whether a radar is present (step 526).

FIGS. 18, 19 and 20 illustrate the generation of data that is utilized in the described embodiments of the invention for determining whether a radar is present. More specifically, FIG. 18 illustrates the specific pulse data that is stored or evaluated. In the described embodiment, the pulse data is stored in tabular form and includes identification of the start time, the rise time, the pulse width and the fall time for each of a plurality of pulses. Based on the data of FIG. 18, FIG. 19 illustrates some of the aforementioned processing for determining whether a radar is present in view of a missing pulse. More specifically, a set of pulse intervals is defined between pulses and is mapped according to quantity. For example, the most common pulse interval is the pulse interval having a value of (start time) E—(start time) A. The frequency of this pulse interval is represented herein as "n1". Such determinations are then used as described herein for determining radar is present even if a pulse is missing (was not received by the receiver). Finally, FIG. 20 illustrates some of the processing relating to the presence of additional pulses and the method for detecting the presence of a radar in such cases. One important aspect of the table of FIG. 20 is that FIG. 20 illustrates that start times and corresponding pulse widths are based upon every other pulse. Accordingly, the pulse widths are twice as long as expected ordinarily. For example, the first row illustrates subtraction of a start time for pulse "A" from the start time for pulse "I".

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. As may be seen, the described embodiments may be modified in many different ways without departing from the scope or teachings of the invention.

What is claimed is:

1. A radio transceiver, comprising:
radio front end for receiving, amplifying and down converting and filtering a radio frequency (RF) signal to produce a low frequency received signal;
analog to digital converter operatively coupled to receive the low frequency received signal, the ADC producing a digital low frequency signal;
baseband processor coupled to receive and process the digital low frequency signal;
radar detection circuit coupled to receive the digital low frequency signal, wherein the radar detection circuit further includes:
multiplication circuitry for receiving and squaring a low frequency digital signal;
moving average filter coupled to selectively receive an output signal produced by the multiplication circuitry, the moving average filter producing a moving average filtered signal;
first conversion block for converting a magnitude of the moving average filtered signal into decibel values; and
a threshold comparison state machine coupled to receive an output of the first conversion block in decibel values, the threshold comparison state machine for measuring rise time, fall time, and magnitude levels of received signals and detects a received radar pulse pattern and produces a corresponding control signal indicating whether a radar signal has been detected to the baseband processor; and
wherein the processor is coupled to receive rise time, fall time, and magnitude levels of received signals from the threshold comparison state machine, and wherein the processor determines whether the radar signal has been received and, if so, inhibits transmissions on overlapping frequency bands.

2. The radio transceiver of claim 1 wherein the radar detection circuit further includes a second conversion block coupled to selectively receive the output signal produced by the multiplication circuitry, the second conversion block converting the magnitude of the moving average filtered signal into decibel values.

3. The radio transceiver of claim 2 wherein the radar detection circuit further includes a summing node for subtracting a receiver gain setting from the magnitude in decibel values of the output of the multiplication circuitry.

4. The radio transceiver of claim 3 wherein the moving average filter and the first conversion block are coupled serially in a first branch and the second conversion block and the summing node are coupled in a second branch and wherein logic selects between the first and second branch based upon whether a wireless local area network (WLAN) signal is being received.

5. The radio transceiver of claim 4 wherein the first branch is selected if the wireless LAN signal is being received and the second branch is selected if the wireless LAN signal is not being received.

6. A method for detecting a radar signal, comprising:
   in a radio front end circuit, receiving, amplifying and down-converting and filtering a radio frequency (RF) signal and producing an ingoing down-converted low frequency signal;
   producing a low frequency digital ingoing signal based on the ingoing down-converted signal;
   processing, in a baseband processor, the low frequency digital ingoing signal;
   receiving and squaring the low frequency digital ingoing signal and producing squared components of the low frequency digital ingoing signal;
   averaging the squared components of the low frequency digital ingoing signal in a moving average filter that is coupled to receive the squared components and producing a moving average filtered signal;
   producing a logarithmic signal based on the moving average filtered signal; and
   receiving the logarithmic signal and:
      measuring rise time, fall time, and magnitude levels of the logarithmic signal;
      determining that a radar pulse pattern was received; and
      inhibiting transmissions on overlapping frequency bands.

7. The method of claim 6 further including:
   removing the moving average filter from a processing path and producing the logarithmic signal based on the squared components produced by multiplication circuitry.

8. The method of claim 7 further including adjusting the logarithmic signal based on a gain setting.

9. The method of claim 7 further including removing the moving average filter from the processing path when a wireless local area network signal is not being received and including the moving average filter in the processing path when the wireless local area network signal is being received.

10. The method of claim 6 further including, in the radio front end, producing low pass filtered signals having I and Q components as the ingoing down-converted low frequency signal wherein the I and Q components are squared in the squaring step.

* * * * *